R. B. DAVIDSON.
GRAIN HEADING MACHINE.
APPLICATION FILED NOV. 24, 1917.
1,285,637.
Patented Nov. 26, 1918.
3 SHEETS—SHEET 2.
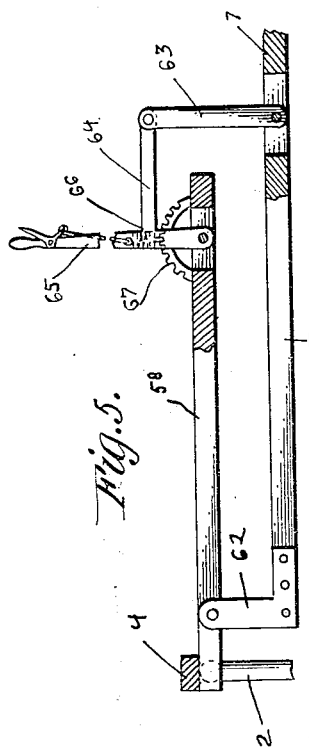
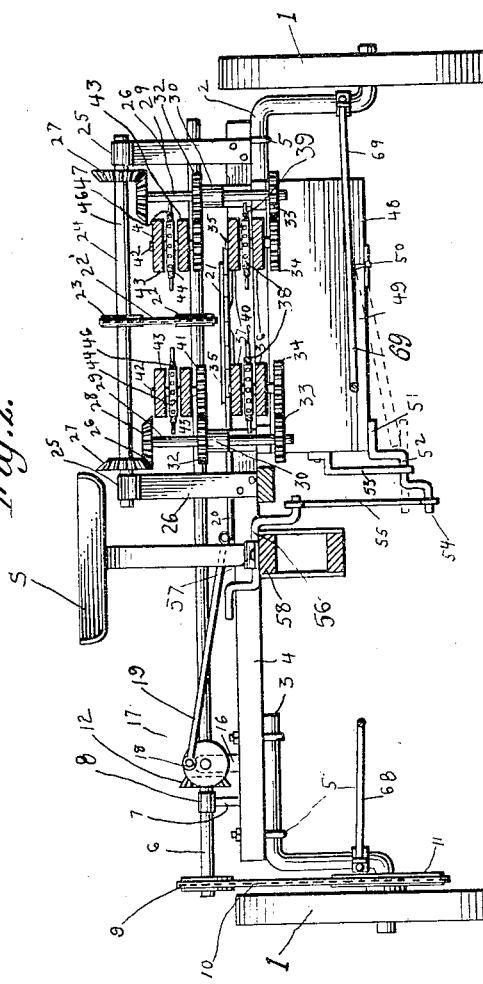
WITNESSES
Guy M. Spring
S. M. M'Coll
INVENTOR
Rufus Burley Davidson
BY Richard Owen.
ATTORNEY

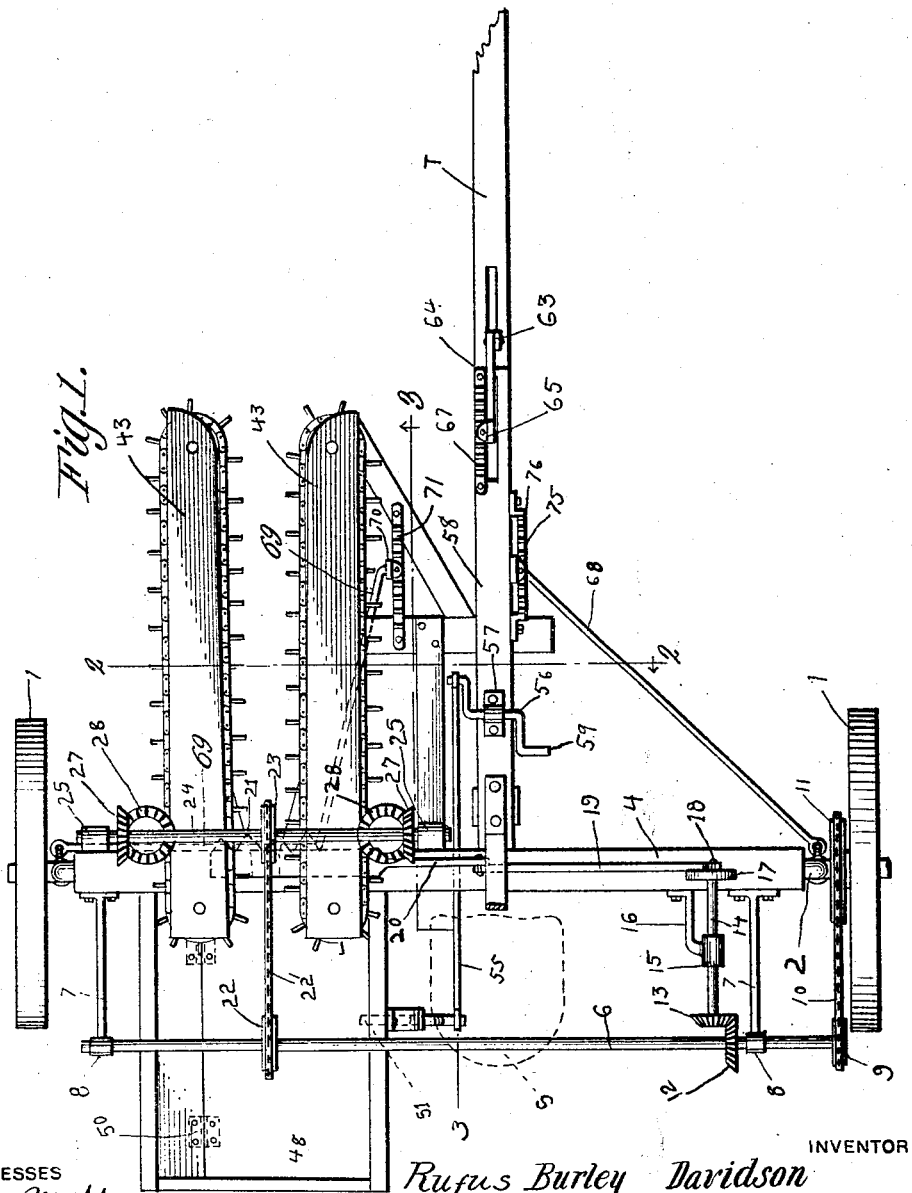

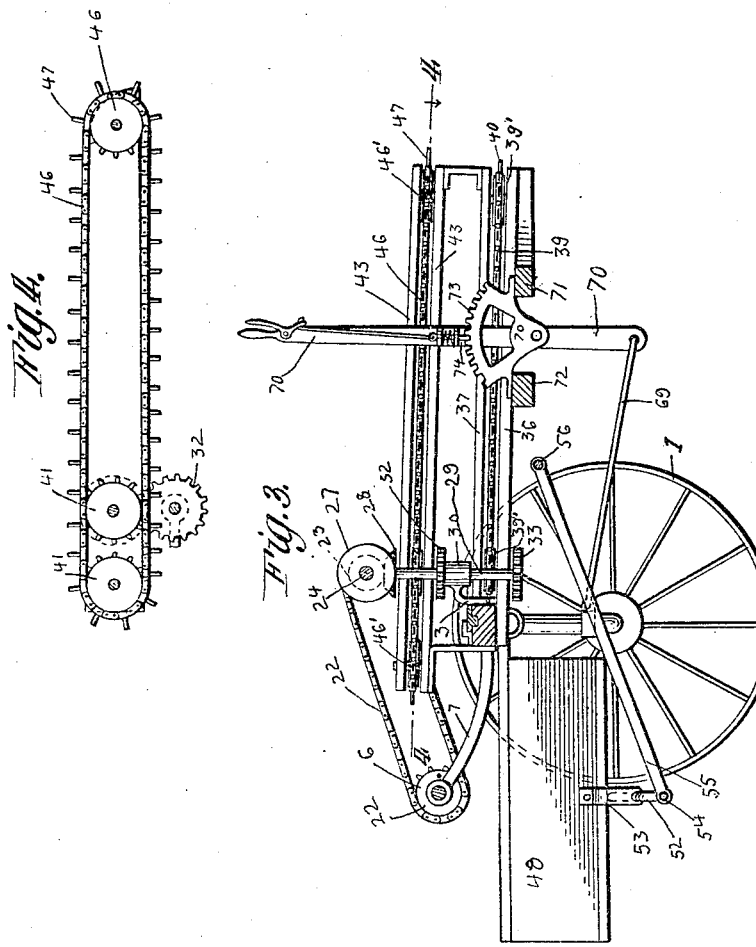

UNITED STATES PATENT OFFICE.

RUFUS BURLEY DAVIDSON, OF BIG SPRING, TEXAS.

GRAIN-HEADING MACHINE.

1,285,637.	Specification of Letters Patent.	Patented Nov. 26, 1918.

Application filed November 24, 1917. Serial No. 203,804.

*To all whom it may concern:*

Be it known that I, RUFUS BURLEY DAVIDSON, a citizen of the United States, residing at Big Spring, in the county of Howard and State of Texas, have invented certain new and useful Improvements in Grain-Heading Machines, of which the following is a specification.

This invention relates to agricultural implements and more particularly to topping or heading machine of the type used for gathering broom corn, sorghum, maize and the like.

The main object of the invention is to provide a simply constructed and efficient machine of this character adapted to pass through a field of such plants, cut off their heads, and pass them to a box carried by the machine, which latter is constructed to be dumped when the desired quantity of heads has been collected therein.

Another object of the invention is to provide a machine of this character in which the gathering chains may be adjusted to adapt the machine for cutting the heads of the grain at different heights.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a plan view of a machine constructed in accordance with this invention, Fig. 2 is a transverse section taken on the line 2—2 of Fig. 1, Fig. 3 is a longitudinal section taken on the line 3—3 of Fig. 1, Fig. 4 is a detail horizontal section taken on the line 4—4 of Fig. 3, and Fig. 5 is a side elevation partly in section showing the mounting of the tongue and the means for raising and lowering it.

In the embodiment illustrated, the machine constituting this invention is supported by two wheels 1 which are mounted on the offset ends of stub axles 2, the cross bars 3 of which may be positioned at any desired height from the ground and have secured thereto a bed plate or bar 4, said plate being here shown secured by clips 5.

A main drive shaft 6 is supported by brackets 7 which project rearwardly from the bed plate 4 as is shown clearly in Fig. 1, said brackets having bearings 8 in their outer ends in which said shaft 6 is designed to turn. This shaft 6 carries a sprocket wheel 9 at one end over which passes a chain 10 which also engages a sprocket wheel 11 on the hub of the right hand wheel 1 and by means of which motion is imparted to said shaft 6 on the turning of the wheel caused by the movement of the machine over a field or other surface.

A bevel gear 12 is fixed to the drive shaft 6 and meshes with a similar gear 13 carried by a shaft 14 mounted in a bearing 15 on a bracket 16 which projects from the rear face of the plate 4 as is shown clearly in Figs. 1 and 2. A crank disk 17 is fixed to the inner end of shaft 14 and has a wrist pin 18 projecting from one face thereof and with which is engaged a pitman 19. This pitman 19 is connected at its other end with a sickle 20 which carries at its free ends knives 21 which are suitably positioned for cutting off the heads of the plants desired to be gathered by the machine. It will thus be seen that the rotation of shaft 6 will impart a reciprocatory motion to the sickle knives by the connecting means just above described.

A sprocket wheel 22 is also carried by said shaft and a coöperating sprocket gear 23 is carried by a counter shaft 24 mounted in suitable bearings 25 at the upper ends of standards 26 supported by the bedplate 4 as is shown clearly in Fig. 2. A sprocket chain 22' connects the sprockets 22 and 23, and by this connection of shaft 6 with the counter shaft 24 the rotary movement of said shaft 6 will be imparted to the shaft 24 and will operate therethrough to drive the grain gathering chains presently to be described.

Bevel gears 27 are carried by the counter shaft 24, being longitudinally spaced from each other and which mesh with coöperating bevel gears 28 carried by the upper ends of shafts 29, which latter are mounted in suitable brackets 30 at the free ends of brackets 31 supported by the bedplate 4, as is shown in Fig. 3.

These shafts 29 also each have fixed thereto gear wheels 32 and 33, the gears 32 being positioned above the bearings 30 and the gears 33 being arranged at the lower ends of said shafts as is shown clearly in Fig. 2.

The gears 33 carried by the lower ends of the upright shafts 29 mesh with gears 34 carried by the lower ends of stub shafts 35, each of which passes through a pair of vertically spaced boards 36 and 37 between which are mounted on said shafts sprocket wheels 38 around which pass sprocket chains 39 which carry laterally projecting fingers 40 and which are intended for a purpose presently to be described.

The gears 32 on the shafts 29 mesh with similar gears 41 carried by the lower ends of stub shafts 42 which also pass through pairs of vertically spaced boards 43 between which are mounted on the shafts 42 sprocket wheels 44 and around which pass sprocket chains 46 carrying fingers 47 similar to those just above described. These sprocket chains 39 and 46 pass also around sprocket gears 39' and 46' as is shown clearly in Fig. 3. The sprocket gears or wheels 39' and 46' are also mounted between the boards 43 and the boards 36 and 37, said pairs of boards being arranged as shown in Figs. 1 and 2 and spaced laterally apart to provide a passageway for the stalks of the grain to be gathered and headed, the knives of the sickle being arranged in said passageway at the inner end thereof. The gathering fingers carried by the sprocket chains project laterally into said passageway as is shown clearly in Fig. 1 and operate to feed the grain thereinto during the passage of the machine over the field as will be presently hereinafter more fully described.

A collecting box 48 depends from the bar 4 below the sickle as is shown clearly in Figs. 1 and 2 and is preferably made of a size sufficient to contain from three to four hundred pounds of heads, but obviously it may be of any suitable or desired size. This box 48 has a downwardly opening bottom closure 49 hinged as shown at 50 and which is held in closed position by a catch member 51 which is here shown carried by a crank shaft 52 rotatably mounted in a hanger 53 secured to one side of said box as is shown clearly in Fig. 2. An offset arm 54 is carried by the crank shaft 52 and is engaged by a pitman 55, the other end of which is connected with one end of a crank shaft 56 mounted in a suitable bearing 57 on the upper face of a tongue supporting bar 58. An actuating pedal 59 extends from the outer end of the crank shaft 56 and is positioned for ready engagement by the foot of the driver so that by the turning of the shaft 56 the closure 49 may be readily opened and the contents of the box 48 dumped.

A tongue T is connected at its rear end by an L-shaped casting 62 with the bar 58, said casting 62 being pivotally engaged with said bar so that the tongue may be raised or lowered relatively thereto. A link 63 is connected at one end with the tongue at a point in advance of its pivotal connection with the bar and is connected at its other end by a cross bar 64 with a lever 65 which is fulcrumed at one end in an opening in the front end of the bar 58 as is shown clearly in Fig. 5. This lever 65 also carries the usual spring pressed dog 66 which is designed to engage an arcuate toothed rack 67 for locking the lever in adjusted position so that the tongue T may be raised or lowered to the desired height and then locked by said lever in adjusted position.

A seat S is preferably mounted on the rear end of bar 58 as is shown clearly in Figs. 1 and 2. A brace rod 68 connects one end of the axle 2 with the tongue T as is shown clearly in Fig. 1 while a similar brace 69 connects the other end of the axle with a lever 70 fulcrumed intermediately of its ends on a bracket 71 supported by a frame 72, said bracket having an arcuate toothed upper face 73 designed to receive a locking dog 74 carried by the lever for locking the lever in adjusted position in the usual manner. This lever 70 is designed for raising and lowering the gathering chains and for locking them in adjusted position so that they may operate on plants of different heights.

A lever 75 is preferably connected with one end of the brace rod 68 and has the usual locking connections with a rack bar 76 and which is designed to assist in raising the frame which supports the gathering chains.

In the use of this improved heading machine which is drawn over a field by any suitable power, preferably by horse power, the engagement of the wheels 1 with the earth will cause shaft 6 to rotate through the sprocket chain connection between said shaft and the wheel and thus impart motion to the various beveled gears and sprocket mechanisms above described. The sprocket chain 22' operates to drive the gathering chains which are arranged in laterally spaced parallel position with their fingers projecting inwardly into the passageway through which the grain to be headed is designed to be fed. These fingers engaging the stalks so fed will force them into engagement with the cutting knives of the sickle which will cut the heads thereof and said heads will drop into the box 48 which is arranged directly below said knives in convenient position for receiving the heads and preventing any of them from becoming lost.

After the desired quantity of heads has been cut and it is desired to discharge the contents of the box 48, this is accomplished in the manner above described by the driver pressing his foot on the pedal 59 and through the pitman 55 releasing the catch mechanism which holds the closure 49 of the box in operative position. This closure will then drop down by gravity, and the contents of the box will be dumped. After the closure is again returned to normal closed position and held in this position by the turning of the crank shaft 52, to the position shown in Fig. 2, the machine is again ready for use.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:—

In a machine of the class described, a wheeled supporting structure including an axle and a tongue, a brace rod connecting said axle and tongue, a lever connected with said rod, means for locking said lever in adjusted position, a vertically movable frame carrying gathering chains, a lever fulcrumed on said structure, another brace rod connected at one end with said axle extended under said chain carrying frame, and connected at its other end with said lever whereby the chains may be raised and lowered at the will of the operator for heading grain of different heights.

In testimony whereof I affix my signature in presence of two witnesses.

RUFUS BURLEY DAVIDSON.

Witnesses:
G. W. DAVIS,
E. R. HUCKALEY.